Feb. 2, 1937. H. A. CURTIS 2,069,225
PRODUCING PHOSPHORUS AND PHOSPHATE FERTILIZER
Filed June 5, 1935
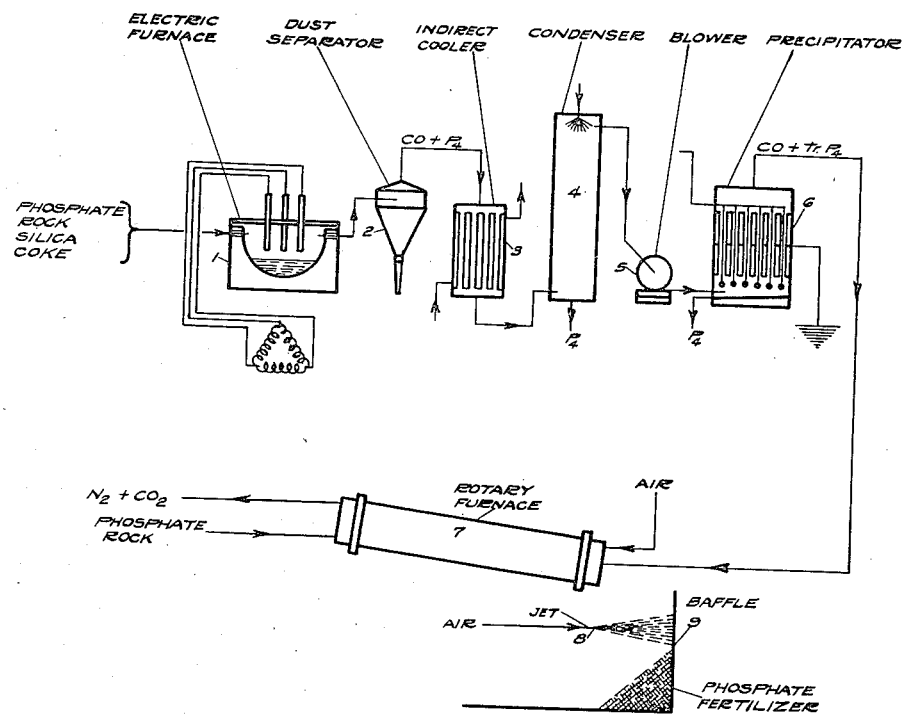
HARRY A. CURTIS
INVENTOR
BY Arthur L. Davis
ATTORNEY Patented Feb. 2, 1937

2,069,225

UNITED STATES PATENT OFFICE 2,069,225

PRODUCING PHOSPHORUS AND PHOSPHATE FERTILIZER

Harry A. Curtis, Knoxville, Tenn., assignor to Tennessee Valley Authority, Wilson Dam, Ala., a corporation Application June 5, 1935, Serial No. 25,091

3 Claims. (Cl. 71—38)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to the production of elemental phosphorus and a phosphate fertilizer containing a substantial proportion of its phosphorus content available for plant food, and particularly the treatment of phosphorus reduction furnace gases in order that substantially all of the phosphorus may be recovered.

One of the objects of this invention is to provide for the disposal of phosphorus reduction furnace gases containing traces of elemental phosphorus, in order that a hazard may be eliminated and that economies may be effected. Another object of this invention is to produce a phosphate fertilizer from phosphate rock. Other objects of this invention include the removal of very small proportions of phosphorus and its compounds from gaseous mixtures containing the same.

Elemental phosphorus alone has been burned, as well as phosphorus reduction furnace gas mixtures, to produce gaseous mixtures which are rich in phosphorus pentoxide and these latter mixtures have been used to treat phosphate rock at a superatmospheric temperature to form phosphate fertilizer. Phosphate rock has been fused in an electric furnace and the phosphorus contained therein rendered partially available by direct quenching in water.

In the process of producing elemental phosphorus from phosphorus reduction furnace vapors, the elemental phosphorus is condensed and precipitated but the gaseous mixture from which the elemental phosphorus was separated always contains a very small proportion of elemental phosphorus which is hazardous, if permitted to escape, or becomes corrosive if steps are not taken for its removal prior to the utilization of the carbon monoxide for any of a number of purposes. I have found that this carbon monoxide, containing a very small proportion of the elemental phosphorus, may be utilized to render phosphate rock available by fusing the rock in contact with the products of combustion of this gaseous mixture. When the gaseous mixture is burned, the very small proportion of elemental phosphorus oxidizes to phosphorus pentoxide, which is subsequently substantially removed by reaction with the heated phosphate rock. The ratio of this trace of phosphorus pentoxide to the total amount of phosphate rock fused is so low that the phosphate fertilizer is produced with the ratio of the calcium oxide to phosphorus pentoxide in the product not substantially different from their ratio in the phosphate rock used.

The accompanying drawing, which forms a part of this specification, is a diagrammatic vertical sectional view of one form of apparatus for the embodiment of my process. A phosphorus reduction furnace charge of phosphate rock, silica and coke is fed to electric furnace 1, and the operation of the furnace controlled to melt the charge at the bottom of the furnace continuously. The ferrophosphorus and slag, respectively, are tapped continuously, and the vapors, which comprise a mixture of carbon monoxide and elemental phosphorus, which are evolved continuously, pass through a dust separator 2, to remove the major portion of the fine, solid charge which is entrained with the vapors. The vapors from the dust separator 2, pass through an indirect cooler 3, where the temperature of the vapors is reduced to approximately the dew point of the elemental phosphorus in the mixture, and then into a condenser 4, where the mixture is further cooled by an aqueous spray which is removed together with the condensed elemental phosphorus from the bottom of the condenser. The vapors from the condenser 4, pass to the intake of blower 5, and are discharged into an electrical precipitator 6, which removes all but a trace of the elemental phosphorus which remains suspended in the vapor. The vapors from the electrical precipitator 6, are burned in a rotary furnace 7, and the products of combustion used to fuse a separate portion of phosphate rock which is charged continuously to this furnace. The fused phosphate rock from rotary furnace 7, is atomized with air from jet 8, the atomized rock solidified by contact with air at substantially atmospheric temperature and collected against baffle 9.

It is evident that there are numerous factors which will influence conditions for the satisfactory operation of my invention, the actual limits of which cannot be established except by detailed study of each set of raw materials and intermediate and finished products involved. Any type of phosphorus reduction furnace may be used but it is preferred to use an electric furnace for this purpose, since the absence of nitrogen in the reduction furnace gases makes the problem of separation of the very substantial proportion of the elemental phosphorus less difficult. The cooling of these gases may be effected by the use of a plurality of indirect coolers, the last of which is preferably an indirect cooler using water to bring the temperature of the gases down to just above the dew point of the elemental phosphorus in the mixture. The gases thus cooled are then in condition for the condensation of most of the elemental phosphorus, preferably by contacting them countercurrently with an aqueous spray, followed by an electrical precipitation to complete the removal of the very substantial proportion of the phosphorus contained in the reduction furnace gases. The gases from the precipitator, however, still contain a very small proportion of elemental phosphorus which presents a hazard if the mixture escapes, or becomes corrosive, due to the oxidation of the phosphorus to phosphorus pentoxide and the hydration of the latter to phosphoric acid, when the gaseous mixture is partially or completely oxidized. This mixture, however, may be burned and the hot products of combustion used to fuse the phosphate rock in the process of rendering it available for plant food. In rendering the rock available it absorbs practically all of the trace of phosphorus pentoxide contained in the combustion products with the ratio of the calcium oxide to phosphorus pentoxide in the product not substantially different from their ratio in the phosphate rock used.

It will be seen, therefore, that this invention actually may be carried out by the modification of certain details without departing from its spirit or scope.

I claim:

1. Process of making phosphorus and a phosphate fertilizer from phosphate rock, silica and carbon, which comprises reducing a charge of the phosphate rock, the silica and the carbon in an electric furnace to produce a gaseous mixture which comprises carbon monoxide and elemental phosphorus; separating a very substantial proportion of the elemental phosphorus from the gaseous mixture by condensation and electrical precipitation; fusing a separate portion of the phosphate rock by contacting with the products of the combustion of the gaseous mixture from which the very substantial proportion of elemental phosphorus has been separated, with the amount of the phosphorus pentoxide in the oxidized gaseous mixture contacting the phosphate rock being only a small proportion of the phosphorus pentoxide content of the phosphate rock being fused; atomizing the fused phosphate rock; and cooling the atomized fused rock rapidly to form a phosphate fertilizer of proper size for direct application to the soil.

2. Process of separating phosphorus from phosphorus reduction furnace gases, which comprises separating a very substantial proportion of the elemental phosphorus from the gaseous mixture, by condensation and separating the very small proportion of the phosphorus remaining in the resulting gaseous mixture by contacting the products of its combustion with phosphate rock for the fusion of the rock with the amount of the phosphorus pentoxide in the oxidized gaseous mixture contacting the phosphate rock being only a small proportion of the phosphorus pentoxide content of the phosphate rock being fused.

3. Process of making a phosphate fertilizer from phosphate rock, which comprises fusing the phosphate rock by contacting it with the products of combustion of a gaseous mixture, which comprises carbon monoxide and a very small proportion of elemental phosphorus resulting from the separation of a very substantial proportion of the elemental phosphorus from the gaseous products obtained during the reduction of a phosphorus reduction furnace charge, with the amount of the phosphorus pentoxide in the oxidized gaseous mixture contacting the phosphate rock being only a small proportion of the phosphorus pentoxide content of the phosphate rock being fused; atomizing the fused phosphate rock; and cooling the atomized fused rock rapidly to form a phosphate fertilizer of proper size for direct application to the soil.

HARRY A. CURTIS.